United States Patent
Comeau et al.

(10) Patent No.: US 10,814,183 B2
(45) Date of Patent: *Oct. 27, 2020

(54) GOLF BALL DISPLAYING IMPROVED ADHESION BETWEEN TIO₂-PIGMENTED LAYER INCORPORATING SILANE-CONTAINING ADHESION PROMOTER AND AN ADJACENT DIFFERING LAYER

(71) Applicant: Acushnet Company, Fairhaven, MA (US)

(72) Inventors: Brian Comeau, Berkley, MA (US); Shawn Ricci, New Bedford, MA (US); Michael Michalewich, Norton, MA (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,929

(22) Filed: Oct. 3, 2019

(65) Prior Publication Data
US 2020/0038714 A1     Feb. 6, 2020

Related U.S. Application Data

(63) Continuation of application No. 16/158,552, filed on Oct. 12, 2018, now Pat. No. 10,486,029, which is a continuation-in-part of application No. 15/626,343, filed on Jun. 19, 2017, now abandoned, which is a continuation of application No. 14/943,314, filed on Nov. 17, 2015, now Pat. No. 9,713,748.

(51) Int. Cl.
| | |
|---|---|
| A63B 37/00 | (2006.01) |
| A63B 37/14 | (2006.01) |
| C08L 83/04 | (2006.01) |
| A63B 45/00 | (2006.01) |
| B29C 67/24 | (2006.01) |
| C08L 83/08 | (2006.01) |
| B29K 75/00 | (2006.01) |
| B29L 31/54 | (2006.01) |
| B29K 105/00 | (2006.01) |
| C08L 83/00 | (2006.01) |
| C08G 77/26 | (2006.01) |

(52) U.S. Cl.
CPC ...... *A63B 37/0075* (2013.01); *A63B 37/0024* (2013.01); *A63B 37/0039* (2013.01); *A63B 37/0076* (2013.01); *A63B 45/00* (2013.01); *B29C 67/24* (2013.01); *C08L 83/08* (2013.01); *A63B 37/0051* (2013.01); *B29C 67/246* (2013.01); *B29K 2075/00* (2013.01); *B29K 2105/0005* (2013.01); *B29L 2031/546* (2013.01); *C08G 77/26* (2013.01); *C08L 83/00* (2013.01)

(58) Field of Classification Search
CPC ........... A63B 37/0075; A63B 37/0076; A63B 37/0039; A63B 37/0051; A63B 37/0024; A63B 45/00; B29L 2031/546; C08L 83/08; C08L 83/00; B29C 67/24; B29C 67/246; C08G 77/26
USPC .................................................. 473/376, 377
See application file for complete search history.

(56) References Cited

U.S. PATENT DOCUMENTS

| | | | |
|---|---|---|---|
| 3,992,014 A | 11/1976 | Retford | |
| 4,560,168 A | 12/1985 | Aoyama | |
| 4,925,193 A | 5/1990 | Melvin et al. | |
| 4,960,281 A | 10/1990 | Aoyama | |
| 5,006,297 A | 4/1991 | Brown et al. | |
| 5,006,573 A * | 4/1991 | Plueddemann | C07F 7/1804 523/214 |
| 5,248,878 A | 9/1993 | Ihara | |
| 5,249,804 A | 10/1993 | Sanchez | |
| 5,300,325 A | 4/1994 | Nealon et al. | |
| 5,334,673 A | 8/1994 | Wu | |
| 5,403,453 A | 4/1995 | Roth et al. | |
| 5,456,972 A | 10/1995 | Roth et al. | |

(Continued)

FOREIGN PATENT DOCUMENTS

| | | | |
|---|---|---|---|
| GB | 1265596 | 3/1972 | |
| JP | 57025867 | 2/1982 | |
| WO | WO2018217507 | * 11/2018 | ............. C08L 83/10 |

OTHER PUBLICATIONS

Dow Corning organosilane.

*Primary Examiner* — John E Simms, Jr.
(74) *Attorney, Agent, or Firm* — Margaret C. Barker

(57) ABSTRACT

Golf ball comprising a colorless coating surrounding and adjacent to a TiO₂ white-pigmented layer comprising a polymeric composition that comprises throughout: (i) passivated TiO₂ particulates amount of from about 1 wt. %-10 wt. % based on total weight of second polymeric composition; and (ii) silane-containing adhesion promoter(s), for example, organosilanes and/or organosiloxanes in an amount of from about 0.1 wt. % to about 5.0 wt. % of the total weight of the polymeric composition. The coating comprises a coating composition that is different than the polymeric composition and does not contain any silane-containing adhesion promoter; and there is no surface treatment with adhesion promoter at an interface between the colorless coating and TiO₂ white-pigmented layer. In lieu of the colorless coating, the golf ball may include a coating that is clear tinted or translucent.

21 Claims, No Drawings

(56) References Cited

U.S. PATENT DOCUMENTS

| | | |
|---|---|---|
| 5,466,424 A | 11/1995 | Kusano et al. |
| 5,484,870 A | 1/1996 | Wu |
| 5,562,552 A | 10/1996 | Thurman |
| 5,575,477 A | 11/1996 | Hwang |
| 5,688,191 A | 11/1997 | Cavallaro et al. |
| 5,713,801 A | 2/1998 | Aoyama |
| 5,733,428 A | 3/1998 | Calabria et al. |
| 5,803,831 A | 9/1998 | Sullivan et al. |
| 5,820,488 A | 10/1998 | Sullivan et al. |
| 5,824,718 A | 10/1998 | Penfold et al. |
| 5,830,087 A | 11/1998 | Sullivan et al. |
| 5,849,168 A * | 12/1998 | Lutz ................ A63B 37/0003 264/255 |
| 5,885,172 A | 3/1999 | Hebert et al. |
| 5,907,012 A | 5/1999 | Voss et al. |
| 5,919,100 A | 7/1999 | Boehm et al. |
| 5,957,787 A | 9/1999 | Hwang |
| 5,965,669 A | 10/1999 | Cavallaro et al. |
| 5,981,654 A | 11/1999 | Rajagopalan et al. |
| 5,981,658 A | 11/1999 | Rajagopalan et al. |
| 6,056,842 A | 5/2000 | Dalton et al. |
| 6,075,223 A | 6/2000 | Harrison |
| 6,096,255 A | 8/2000 | Brown et al. |
| 6,129,881 A | 10/2000 | Puniello |
| 6,149,535 A | 11/2000 | Bissonette et al. |
| 6,180,040 B1 | 1/2001 | Ladd et al. |
| 6,180,722 B1 | 1/2001 | Dalton et al. |
| 6,207,784 B1 | 3/2001 | Rajagopalan |
| 6,213,898 B1 | 4/2001 | Ogg |
| 6,235,230 B1 | 5/2001 | Puniello |
| 6,287,217 B1 | 9/2001 | Sullivan |
| 6,290,615 B1 | 9/2001 | Ogg |
| 6,290,797 B1 | 9/2001 | Gosetti et al. |
| 6,315,915 B1 | 11/2001 | Hebert et al. |
| 6,338,684 B1 | 1/2002 | Winfield et al. |
| 6,358,161 B1 | 3/2002 | Aoyama |
| 6,379,138 B1 | 4/2002 | Puniello et al. |
| 6,383,092 B1 | 5/2002 | Ogg |
| 6,384,136 B1 | 5/2002 | Rajagopalan et al. |
| 6,409,615 B1 | 6/2002 | McGuire et al. |
| 6,425,833 B1 | 7/2002 | Sullivan et al. |
| 6,462,303 B1 | 10/2002 | Brown |
| 6,585,607 B2 | 7/2003 | Tzivanis et al. |
| 6,800,690 B2 | 10/2004 | Rajagopalan |
| 6,869,645 B2 | 3/2005 | Brum |
| 6,905,423 B2 | 6/2005 | Morgan et al. |
| 6,960,629 B2 | 11/2005 | Voorheis et al. |
| 6,998,444 B2 | 2/2006 | Voorheis et al. |
| 7,198,576 B2 | 4/2007 | Sullivan et al. |
| 7,241,232 B2 | 7/2007 | Sullivan et al. |
| 7,244,196 B2 | 7/2007 | Kennedy, III et al. |
| 7,276,231 B2 | 10/2007 | Frerichs et al. |
| 7,279,529 B2 | 10/2007 | Hogge et al. |
| 7,338,391 B2 | 3/2008 | Melanson et al. |
| 7,396,300 B2 | 7/2008 | Tzivanis et al. |
| 7,534,384 B2 | 5/2009 | Tzivanis et al. |
| 7,897,671 B2 | 3/2011 | Rajagopalan |
| 8,475,881 B1 | 7/2013 | Melanson et al. |
| 8,956,488 B2 | 2/2015 | Kennedy, III |
| 10,486,029 B2 * | 11/2019 | Comeau ................ C08L 83/08 |
| 2001/0009310 A1 | 7/2001 | Hebert et al. |
| 2001/0018375 A1 | 8/2001 | Hayashi et al. |
| 2001/0019971 A1 | 9/2001 | Hayashi et al. |
| 2002/0025862 A1 | 2/2002 | Sullivan et al. |
| 2002/0028885 A1 | 3/2002 | Sullivan et al. |
| 2002/0034988 A1 | 3/2002 | Binette |
| 2002/0079615 A1 | 6/2002 | Puniello et al. |
| 2002/0082358 A1 | 6/2002 | Ohira et al. |
| 2002/0160862 A1 | 10/2002 | Morgan et al. |
| 2002/0193181 A1 * | 12/2002 | Kennedy, III .......... C08L 23/08 473/373 |
| 2003/0004013 A1 | 1/2003 | Lutz et al. |
| 2003/0040377 A1 | 2/2003 | Tzivanis |
| 2003/0106442 A1 | 6/2003 | Gosetti |
| 2003/0114255 A1 | 6/2003 | Dalton et al. |
| 2003/0114624 A1 | 6/2003 | Harris |
| 2003/0125134 A1 | 7/2003 | Nardacci |
| 2003/0158001 A1 | 8/2003 | Morgan et al. |
| 2003/0190976 A1 | 10/2003 | Binette |
| 2003/0232666 A1 | 12/2003 | Sullivan |
| 2004/0192833 A1 | 9/2004 | Rajagopalan et al. |
| 2004/0198940 A1 | 10/2004 | Wu et al. |
| 2005/0037866 A1 | 2/2005 | Emerson et al. |
| 2005/0269737 A1 | 12/2005 | Hogge et al. |
| 2008/0300069 A1 | 12/2008 | Rajagopalan et al. |
| 2009/0143170 A1 | 6/2009 | Ohiria et al. |
| 2009/0291777 A1 | 11/2009 | Rajagopalan et al. |
| 2011/0244983 A1 | 10/2011 | Shen et al. |
| 2012/0083364 A1 | 4/2012 | Kennedy, III |
| 2012/0152775 A1 * | 6/2012 | Hogge ............... A63B 37/0003 206/315.9 |
| 2012/0231898 A1 | 9/2012 | Sullivan et al. |
| 2013/0323427 A1 * | 12/2013 | Zieske ............... A63B 37/0051 427/299 |
| 2014/0018193 A1 * | 1/2014 | Morgan ............. A63B 37/0076 473/378 |
| 2014/0073462 A1 * | 3/2014 | Morgan ............. A63B 37/0022 473/378 |
| 2015/0315320 A1 | 11/2015 | Pesek |

* cited by examiner

GOLF BALL DISPLAYING IMPROVED ADHESION BETWEEN TIO₂-PIGMENTED LAYER INCORPORATING SILANE-CONTAINING ADHESION PROMOTER AND AN ADJACENT DIFFERING LAYER

CROSS-REFERENCE TO RELATED APPLICATIONS

This patent application is a continuation of co-pending U.S. patent application Ser. No. 16/158,552, filed on Oct. 12, 2018, which is a continuation-in-part of co-pending U.S. patent application Ser. No. 15/626,343, filed on Jun. 19, 2017, which is a continuation of U.S. patent application Ser. No. 14/943,314, filed on Nov. 17, 2015, now U.S. Pat. No. 9,713,748, each of which is hereby incorporated herein in its entirety.

FIELD OF THE INVENTION

The present invention relates to durable golf balls incorporating white-pigmented layer(s) possessing/displaying excellent dual inter-layer/intra-layer adhesion.

BACKGROUND OF THE INVENTION

Golf balls are made in a variety of constructions and compositions. In this regard, each of the golf ball core, intermediate layer, and cover may be single layered or comprise multiple layers. Examples of golf ball materials range from balata to polybutadiene, ionomer resins, polyurethanes, and/or polyureas. Typically, outer layers are formed about the spherical outer surface of an inner golf ball component via compression molding, casting, or injection molding.

Golf ball manufacturers continuously experiment with golf ball constructions and material formulations in order to target and improve aerodynamic and/or inertial properties and achieve desired feel without sacrificing durability. In this regard, sufficient adhesion between golf ball layers is essential in achieving adequate impact durability. Without a satisfactory amount of adhesion between these layers, both the impact durability as well as the shear resistance of the cover can suffer.

This issue typically presents when the materials of adjacent golf ball layers don't bond together well. For example, the bond strength or "adhesive strength" between an ionomeric casing/intermediate layer and a polyurethane cover layer may be unacceptably low.

Poor interlayer bond or adhesive strength can result in layer separation or "delamination" when the golf ball is struck by a club. Layer separation may be visually apparent as "bubbling" or air pockets between the two layers. Delamination detrimentally affects not only the appearance of the golf ball but playability as well. Accordingly, golf ball manufacturers look for cost effective compounds and methods for addressing this problem in order to preserve brand recognition and reputation.

Currently, several different types of adhesion promoting pre-treatment processes exist for addressing cut and shear issues caused by lack of adhesion between layers. Examples of pretreatments include surface roughening; surface energy modifications such as corona, plasma, and flame treatments; adhesives; adhesion promoters and combinations thereof. Adhesives are typically applied via spray or dip and usually require a drying and post cure step. Adhesion promoters are likewise usually applied by dip or spray, followed by rinsing and drying steps.

In this regard, silane adhesion promoter surface pretreatments and tie layers have been used to improve interlayer adhesion between adjacent differing mated layers. See, e.g., commonly owned U.S. Pat. No. 6,926,621 of Lutz. et al., hereby incorporated herein in its entirety. With such surface pretreatments, the silane adhesion promoter, either neat (without solvent) or in solution, is exposed to or applied about the outer surface of one layer before mating or otherwise joining it with a second layer. The silane adhesion promoter provides a reactive surface for creating strong bonds between the treated layer and an adjacent different layer. However, silane-containing adhesion promoters have undesirably limited shelf lives once performed/applied and will fail to provide adequate adhesion between those layers unless molding follows within a short specified time window of the surface pretreatment or application of the tie layer.

Accordingly, silanes were eventually tried within the golf ball composition itself to improve one of intra-layer adhesion or inter-layer adhesion. See e.g., Kennedy et al. 2012/0083364. Later, in co-owned and related U.S. patent application Ser. No. 15/626,343, filed on Jun. 19, 2017 ("the '343 applications") and U.S. Pat. No. 9,713,748 ("the '748 patent") of Binette et al., it was discovered that both inter-layer and intra-layer adhesion could be improved when a given amount of silane-containing adhesion promoter(s), within the range of from about 0.1 wt. % to about 5.0 wt. %, has a first required number of free functional groups to bond the second layer and the first layer at an interface in addition to a second required number of free functional groups bonding and/or crosslinking ingredients within the second layer.

Unfortunately, these same results aren't achieved when the layer incorporating silane-containing adhesion promoter(s) is white pigmented with $TiO_2$. Accordingly, there remains a need to develop white-pigmented golf balls that can produce the same excellent dual inter-layer/intra-layer adhesion of non-pigmented layer formulations containing silane-containing adhesion promoter(s). Such golf balls, if meanwhile producible cost-effectively within existing golf ball manufacturing processes, would be particularly desirable and useful. The present inventive golf ball and method of making same addresses and solves these needs.

SUMMARY OF THE INVENTION

Accordingly, golf balls of the invention include at least one layer that incorporates throughout both titanium dioxide ($TiO_2$) and silane-containing adhesion promoter and yet displays excellent dual inter-layer/intra-layer adhesion cost effectively and without eliminating either of the $TiO_2$ or silane-containing adhesion promoter ingredients.

In particular, in one embodiment, a golf ball of the invention comprises a colorless coating surrounding and adjacent to a $TiO_2$ white-pigmented layer comprising a polymeric composition that comprises throughout: (i) a plurality of passivated $TiO_2$ particulates; and (ii) at least one silane-containing adhesion promoter in an amount of from about 0.1 wt. % to about 5.0 wt. % of the total weight of the polymeric composition; wherein the coating comprises a coating composition that is different than the polymeric composition and does not contain any silane-containing adhesion promoter; and wherein there is no surface treatment with adhesion promoter at an interface between the colorless coating and $TiO_2$ white-pigmented layer. In lieu of the colorless coating, the golf ball may include a coating that is clear tinted or translucent.

The passivated $TiO_2$ particulates may be included in the polymeric composition in an amount of from about 1 wt. % to about 10 wt. % based on the total weight of the polymeric composition. The polymeric composition may comprise a polyurethane, which may be thermoplastic or thermoset. The polymeric composition may alternatively or also comprise an ionomer or highly neutralized polymer. In one embodiment, the $TiO_2$ white-pigmented layer is a cover.

In another embodiment, a golf ball of the invention may comprise a first layer comprising a first polymeric composition; and a second layer that is adjacent to the first layer and comprises a second polymeric composition that is different than the first polymeric composition and comprises throughout: (i) a plurality of passivated $TiO_2$ particulates; and (ii) at least one silane-containing adhesion promoter such that a given amount thereof within the range of from about 0.1 wt. % to about 5.0 wt. % has a first required amount of free functional groups to bond the second layer and the first layer at an interface in addition to a second required amount of functional groups bonding and/or crosslinking ingredients within the second polymeric composition of the second layer.

The first layer does not contain any silane-containing adhesion promoter. Furthermore, neither the first layer nor the second layer is surface pretreated with any silane-containing adhesion promoter; nor is there any silane-containing tie layer disposed at an interface between the first layer and the second layer.

In a golf ball of the invention, the at least one silane-containing adhesion promoter may be selected, for example, from the group consisting of organosilanes or silane-based organosiloxanes.

The passivated $TiO_2$ particulates may be included in the second polymeric composition in an amount of from about 1 wt. % to about 10 wt. % based on the total weight of the second polymeric composition.

In a particular embodiment, the plurality of passivated $TiO_2$ particulates are surface-treated with alumina/silica. In another particular embodiment, at least some passivated $TiO_2$ particulates are surface treated with alumina/silica. In a specific embodiment, at least some of the passivated $TiO_2$ particulates are surface treated with an alumina/zirconia-based coating. In a specific such embodiment, the passivated $TiO_2$ particulates are included in the second polymeric composition in an amount of at least 2 wt. % and up to about 10 wt. % based on the total weight of the second polymeric composition.

Passivated $TiO_2$ particulate may be included having a diameter of from about 200 nm to about 350 nm.

In a particular embodiment, the second polymeric composition is a polyurethane.

In a specific such embodiment, the polyurethane is thermoplastic. In a different such embodiment, the polyurethane is thermoset. In this particular embodiment, the first polymeric composition may be an ionomer. In a specific such embodiment, the first layer is an inner cover layer and the second layer is an outer cover layer.

In this embodiment, the first layer may surround a dual core having an inner core layer and an outer core layer, wherein at least one of the inner core layer and outer core layer is comprised of polybutadiene. In one such embodiment, the inner core layer may comprise a thermoplastic composition. For example, the thermoplastic composition may comprise a highly neutralized polymer.

In one embodiment, at least some of the passivated $TiO_2$ particulates have a diameter of less than 200 nm. Additionally or alternatively, at least some of the passivated $TiO_2$ particulates may have a diameter of greater than 350 nm.

In other embodiments, the plurality passivated $TiO_2$ particulates consists of $TiO_2$ particulates having a diameter of from about 200 nm to about 350 nm.

A golf ball of the invention can alternatively comprise a first layer that consists of an ionomer; and a second layer that surrounds and is adjacent to the first layer and consists of a polyurethane; wherein the polyurethane of the second layer comprises throughout: (i) a plurality of passivated $TiO_2$ particulates; and (ii) at least one silane-containing adhesion promoter such that a given amount thereof within the range of from about 0.1 wt. % to about 5.0 wt. % has a first required amount of free functional groups to bond the second layer and the first layer at an interface in addition to a second required amount of functional groups bonding and/or crosslinking ingredients within the second polymeric composition of the second layer. The ionomer of the first layer does not comprise any silane-containing adhesion promoter; and the first and second layer are not surface treated with any adhesion promoter at an interface between the first layer and second layer.

In other golf balls of the invention, the first polymeric composition is a non-polyurethane composition and the second polymeric composition is a polyurethane composition. The non-polyurethane composition may be an ionomer, for example. In another embodiment, the first polymeric composition is a polyurethane composition and the second polymeric composition is a non-polyurethane composition.

In an alternative embodiment, the first polymeric composition is a non-polyurea composition and the second polymeric composition is a polyurea composition. Or, the first polymeric composition may be a polyurea composition and the second polymeric composition may be a non-polyurea composition.

In yet another embodiment, the first polymeric composition is a non-polyurethane/urea hybrid composition and the second polymeric composition is a polyurethane/urea hybrid composition. Or, the first polymeric composition may be a polyurethane/urea hybrid composition and the second polymeric composition may be a non-polyurethane/urea hybrid composition.

In a different embodiment, the first polymeric composition is a rubber composition and the second polymeric composition is a non-rubber composition. Alternatively, the first polymeric composition may be a non-rubber composition whereas the second polymeric composition is a rubber composition.

In one embodiment, the first polymeric composition is a not a polyurethane and the second polymeric composition is a polyurethane. The first polymeric composition may be an ionomer, for example. In another embodiment, the first polymeric composition may be a polyurethane and the second polymeric composition is not a polyurethane.

In an alternative embodiment, the first polymeric composition is not a polyurea and the second polymeric composition is a polyurea. Or, the first polymeric composition may be a polyurea while the second polymeric composition is not a polyurea.

In yet another embodiment, the first polymeric composition is a not a polyurethane/urea hybrid and the second polymeric composition is a polyurethane/urea hybrid. Or, the first polymeric composition may be a polyurethane/urea hybrid while the second polymeric composition is not a polyurethane/urea hybrid.

In a different embodiment, the first polymeric composition is not a rubber while the second polymeric composition is a rubber. Alternatively, the first polymeric composition may be a rubber while the second polymeric composition is not a rubber.

Embodiments are also envisioned wherein the first polymeric composition is a first polyurethane composition and the second polymeric composition is a second polyurethane composition that is different than the first polyurethane composition. Likewise, the first polymeric composition may be a first polyurea composition while the second polymeric composition is a second polyurea composition that is different than the first polyurea composition.

In other embodiments, the first polymeric composition may be a first polyurethane/urea hybrid composition while the second polymeric composition is a second polyurethane/urea hybrid composition that is different than the first polyurethane/urea hybrid composition. And in still other embodiments, the first polymeric composition may be a first rubber composition while the second polymeric composition is a second rubber composition that is different than the first rubber composition.

In alternative embodiments, the first polymeric composition is a first polyurethane and the second polymeric composition is a second polyurethane that is different than the first polyurethane composition. Likewise, the first polymeric composition may be a first polyurea while the second polymeric composition is a second polyurea that is different than the first polyurea.

In other embodiments, the first polymeric composition may be a first polyurethane/urea hybrid while the second polymeric composition is a second polyurethane/urea hybrid that is different than the first polyurethane/urea hybrid. And in still other embodiments, the first polymeric composition may be a first rubber while the second polymeric composition is a second rubber that is different than the first rubber.

It is envisioned that the first polymeric composition and the second polymeric composition may each be any polymeric composition suitable for forming a golf ball layer, as long as the first polymeric composition and the second polymeric composition differ in some respect (in addition to presence/absence of silane-containing adhesion promoter and passivated $TiO_2$ particulates) such as having different chemical and/or physical properties or being otherwise incompatible.

For example, in one embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, a polyurethane/urea hybrid, ionomer, polyamide, polyester, or rubber as well as passivated $TiO_2$ particulates and silane-containing adhesion promoter(s) throughout.

In another embodiment, the first polymeric composition consists of a thermoplastic or thermoset polyurethane, a urea, a polyurethane/urea hybrid, an ionomer, a polyamide, a polyester, or a rubber; and the second polymeric composition consists of a different thermoplastic or thermoset polyurethane, urea, a polyurethane/urea hybrid, ionomer, polyamide, polyester, or rubber as well as passivated $TiO_2$ particulates and silane-containing adhesion promoter(s) throughout.

In one embodiment, the second layer surrounds the first layer. For example, the white-pigmented second layer may be a cover layer that consists of a polyurethane composition and surrounds the first layer, which is an inner cover layer or casing layer and is comprised of an ionomer. In this embodiment, the first layer does not contain any passivated $TiO_2$ particulates nor any silane-containing adhesion promoter(s).

In other embodiments, the first layer surrounds the second layer. For example, the first layer may be transparent or translucent polyurethane outer cover layer or coating layer that surrounds and is adjacent to the second layer. The first layer may be colorless, clear tinted or translucent, whereas the second layer is always $TiO_2$ white-pigmented.

The invention is also directed to a method of making a golf ball of the invention, comprising providing a first layer that comprises a first polymeric composition; forming a second layer adjacent to the first layer wherein the second layer comprises a second polymeric composition that is different than the first polymeric composition; wherein the second layer comprises throughout: (i) a plurality of passivated $TiO_2$ particulates and (ii) at least one silane-containing adhesion promoter such that a given amount thereof within the range of from about 0.1 wt. % to about 5.0 wt. % has a first required amount of free functional groups to bond the second layer and the first layer at an interface in addition to a second required amount of functional groups bonding and/or crosslinking ingredients within the second polymeric composition of the second layer.

The first layer and/or the second layer, as well as any third layer, etc., may be formed during a molding process selected, for example, from the group consisting of compression molding; injection molding; and casting.

DETAILED DESCRIPTION

Advantageously, golf balls of the present invention achieve the same excellent dual inter-layer/intra-layer adhesion in connection with a $TiO_2$ white-pigmented layer that as that achieved with respect to non-pigmented layers including silane-containing adhesion promoter disclosed in parents U.S. patent application Ser. No. 15/626,343, filed on Jun. 19, 2017 and U.S. patent application Ser. No. 14/943,314, filed on Nov. 17, 2015. And such results are desirably produced cost effectively and without eliminating either of the $TiO_2$ or silane-containing adhesion promoter ingredients.

In one embodiment, a golf ball of the invention comprises a first layer comprising a first polymeric composition; and a second layer that is adjacent to the first layer and comprises a second polymeric composition that is different than the first polymeric composition and comprises throughout: (i) a plurality of passivated $TiO_2$ particulates; and (ii) at least one silane-containing adhesion promoter.

The at least one silane-containing adhesion promoter may be included in the second polymer composition such that a given amount thereof within the range of from about 0.1 wt. % to about 5.0 wt. % has a first required amount of free functional groups to bond the second layer and the first layer at an interface in addition to a second required amount of functional groups bonding and/or crosslinking ingredients within the second polymeric composition of the second layer. The first layer does not contain any silane-containing adhesion promoter. Furthermore, neither the first layer nor the second layer is surface pretreated with any silane-containing adhesion promoter; nor is there any silane-containing tie layer disposed at an interface between the first layer and the second layer.

That is, the at least one silane-containing adhesion promoter is included in an amount of from about 0.1 wt. % to about 5.0 wt. % and meanwhile contains a first required amount of free functional groups bonding the second layer and the first layer at an interface, as well as a second required amount of functional groups bonding and/or crosslinking ingredients within the second polymeric composition of the second layer. The total amount/number of free functional groups which the at least one silane-containing adhesion promoter should contain varies with and depends on the specific other ingredients and amounts thereof that are preselected for each of the second polymeric composition and the compositions of all adjacent layers (i.e., the second polymeric composition may be included in a golf ball of the invention as an outermost layer or coating, or alternatively, as an intermediate golf ball layer).

In a golf ball of the invention, the at least one silane-containing adhesion promoter may be selected, for example, from the group consisting of organosilanes or silane-based organosiloxanes.

The passivated $TiO_2$ particulates may be included in the second polymeric composition in an amount of from about 1 wt. % to about 10 wt. % based on the total weight of the second polymeric composition.

In a particular embodiment, the plurality passivated $TiO_2$ particulates are surface-treated with alumina/silica.

In another particular embodiment, at least some passivated $TiO_2$ particulates are surface treated with alumina/silica. In a specific such embodiment, at least some of the passivated $TiO_2$ particulates are surface treated with a different passivating ingredient. For example, at least some of the passivated $TiO_2$ particulates may be surface treated with an alumina/zirconia-based coating. In one embodiment, at least 50 wt % of the plurality of passivated $TiO_2$ particulates may be alumina/silica surface treated $TiO_2$ particulates. In another embodiment, at least 50 wt % of the plurality of passivated $TiO_2$ particulates may be alumina/silica surface treated $TiO_2$ particulates. In yet another embodiment, at least 75 wt % of the plurality of passivated $TiO_2$ particulates may be alumina/silica surface treated $TiO_2$ particulates In alternative embodiments, less than 50 wt % of the plurality of passivated $TiO_2$ particulates may be alumina/silica surface treated $TiO_2$ particulates. In such some embodiments, less than 25 wt % of the plurality of passivated $TiO_2$ particulates may be alumina/silica surface treated $TiO_2$ particulates. In fact embodiments are envisioned wherein the passivated $TiO_2$ particulates are entirely surface treated with the at least one different passivating ingredient such as an alumina/zirconia-based coating.

In a specific such embodiment, the passivated $TiO_2$ particulates are included in the second polymeric composition in an amount of at least 2 wt. % and up to about 10 wt. % based on the total weight of the second polymeric composition.

$TiO_2$ particulates may be included having a diameter of from about 200 nm to about 350 nm.

In a particular embodiment, the second polymeric composition is a polyurethane. In a specific such embodiment, the polyurethane is thermoplastic. In a different such embodiment, the polyurethane is thermoset. In this particular embodiment the first polymeric composition may be an ionomer. In a specific such embodiment, the first layer is an inner cover layer and the second layer is an outer cover layer.

In this embodiment, the first layer may surround a dual core having an inner core layer and an outer core layer, wherein at least one of the inner core layer and outer core layer is comprised of polybutadiene. In one such embodiment, the inner core layer may comprise a thermoplastic composition. For example, the thermoplastic composition may comprise a highly neutralized polymer.

In one embodiment, at least some of the passivated $TiO_2$ particulates have a diameter of less than 200 nm. Additionally or alternatively, at least some of the passivated $TiO_2$ particulates may have a diameter that is greater than 350 nm.

In other embodiments, the plurality passivated $TiO_2$ particulates consists of $TiO_2$ particulates having a diameter of from about 200 nm to about 350 nm.

A golf ball of the invention can alternatively comprise a first layer that consists of an ionomer; and a second layer that surrounds and is adjacent to the first layer and consists of a polyurethane; wherein the polyurethane of the second layer comprises throughout: (i) a plurality of passivated $TiO_2$ particulates; and (ii) at least one silane-containing adhesion promoter such that a given amount thereof within the range of from about 0.1 wt. % to about 5.0 wt. % has a first required amount of free functional groups to bond the second layer and the first layer at an interface in addition to a second required amount of functional groups bonding and/or crosslinking ingredients within the second polymeric composition of the second layer. The ionomer of the first layer does not comprise any silane-containing adhesion promoter; and the first and second layer are not surface treated with any adhesion promoter at an interface between the first layer and second layer.

In other golf balls of the invention, the first polymeric composition is a non-polyurethane composition and the second polymeric composition is a polyurethane composition. The non-polyurethane composition may be an ionomer, for example. In another embodiment, the first polymeric composition is a polyurethane composition and the second polymeric composition is a non-polyurethane composition.

In an alternative embodiment, the first polymeric composition is a non-polyurea composition and the second polymeric composition is a polyurea composition. Or, the first polymeric composition may be a polyurea composition and the second polymeric composition may be a non-polyurea composition.

In yet another embodiment, the first polymeric composition is a non-polyurethane/urea hybrid composition and the second polymeric composition is a polyurethane/urea hybrid composition. Or, the first polymeric composition may be a polyurethane/urea hybrid composition and the second polymeric composition may be a non-polyurethane/urea hybrid composition.

In a different embodiment, the first polymeric composition is a rubber composition and the second polymeric composition is a non-rubber composition. Alternatively, the first polymeric composition may be a non-rubber composition whereas the second polymeric composition is a rubber composition.

In one embodiment, the first polymeric composition is a not a polyurethane and the second polymeric composition is a polyurethane. The first polymeric composition may be an ionomer, for example. In another embodiment, the first polymeric composition may be a polyurethane and the second polymeric composition is not a polyurethane.

In an alternative embodiment, the first polymeric composition is not a polyurea and the second polymeric composition is a polyurea. Or, the first polymeric composition may be a polyurea while the second polymeric composition is not a polyurea.

In yet another embodiment, the first polymeric composition is a not a polyurethane/urea hybrid and the second polymeric composition is a polyurethane/urea hybrid. Or, the first polymeric composition may be a polyurethane/urea hybrid while the second polymeric composition is not a polyurethane/urea hybrid.

In a different embodiment, the first polymeric composition is not a rubber while the second polymeric composition is a rubber. And alternatively, the first polymeric composition may be a rubber while the second polymeric composition is not a rubber.

Embodiments are also envisioned wherein the first polymeric composition is a first polyurethane composition and the second polymeric composition is a second polyurethane composition that is different than the first polyurethane composition.

Likewise, the first polymeric composition may be a first polyurea composition while the second polymeric composition is a second polyurea composition that is different than the first polyurea composition.

In other embodiments, the first polymeric composition may be a first polyurethane/urea hybrid composition while the second polymeric composition is a second polyurethane/urea hybrid composition that is different than the first polyurethane/urea hybrid composition.

And in still other embodiments, the first polymeric composition may be a first rubber composition while the second polymeric composition is a second rubber composition that is different than the first rubber composition.

In alternative embodiments, the first polymeric composition is a first polyurethane and the second polymeric composition is a second polyurethane that is different than the first polyurethane composition. Likewise, the first polymeric composition may be a first polyurea while the second polymeric composition is a second polyurea that is different than the first polyurea.

In other embodiments, the first polymeric composition may be a first polyurethane/urea hybrid while the second polymeric composition is a second polyurethane/urea hybrid that is different than the first polyurethane/urea hybrid.

And in still other embodiments, the first polymeric composition may be a first rubber while the second polymeric composition is a second rubber that is different than the first rubber.

It is envisioned that the first polymeric composition and the second polymeric composition may each be any polymeric composition suitable for forming a golf ball layer, as long as the first polymeric composition and the second polymeric composition differ in some respect (in addition to presence/absence of silane-containing adhesion promoter and in some embodiments presence/absence of passivated $TiO_2$ particulates) such as having different chemical and/or physical properties or being otherwise incompatible.

For example, in one embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, a polyurethane/urea hybrid, ionomer, polyamide, polyester, or rubber as well as passivated $TiO_2$ particulates and silane-containing adhesion promoter(s) throughout.

In another embodiment, the first polymeric composition consists of a thermoplastic or thermoset polyurethane, a urea, a polyurethane/urea hybrid, an ionomer, a polyamide, a polyester, or a rubber; and the second polymeric composition consists of a different thermoplastic or thermoset polyurethane, urea, a polyurethane/urea hybrid, ionomer, polyamide, polyester, or rubber as well as passivated $TiO_2$ particulates and silane-containing adhesion promoter(s) throughout.

In one embodiment, the second layer surrounds the first layer. For example, the white-pigmented second layer may be a cover layer that consists of a polyurethane composition and surrounds the first layer, which is an inner cover layer or casing layer and is comprised of an ionomer. In this embodiment, the first layer does not contain any passivated $TiO_2$ particulates nor any silane-containing adhesion promoter(s).

In other embodiments, the first layer surrounds the second layer. For example, the first layer may be transparent or translucent polyurethane outer cover layer or coating layer that surrounds and is adjacent to the second layer. The first layer may be colorless, clear tinted or translucent, whereas the second layer is always $TiO_2$ white-pigmented.

The invention is also directed to a method of making a golf ball of the invention, comprising providing a first layer that comprises a first polymeric composition; forming a second layer adjacent to the first layer wherein the second layer comprises a second polymeric composition that is different than the first polymeric composition; wherein the second layer comprises throughout: (i) a plurality of passivated $TiO_2$ particulates and (ii) at least one silane-containing adhesion promoter such that a given amount thereof within the range of from about 0.1 wt. % to about 5.0 wt. % has a first required amount of free functional groups to bond the second layer and the first layer at an interface in addition to a second required amount of functional groups bonding and/or crosslinking ingredients within the second polymeric composition of the second layer; and wherein the first layer does not contain any silane-containing adhesion promoter; and wherein first layer and the second layer are not surface treated with at least one silane-containing adhesion promoter, nor or is any silane-containing adhesion promoter-containing tie layer disposed between the first layer and second layer.

The first layer and/or the second layer, as well as any third layer, etc., may be formed during a molding process selected, for example, from the group consisting of compression molding; injection molding; and casting.

In other embodiments, the second layer comprises the at least one silane-containing adhesion promoter in an amount of from about 0.1 wt. % to about 4.5 wt. % of the entire layer; or in an amount of from about 0.1 wt. % to about 4.0 wt. % of the entire layer; or in an amount of from about 0.1 wt. % to about 3.5 wt. % of the entire layer; or in an amount of from about 0.1 wt. % to about 3.0 wt. % of the entire layer; or in an amount of from about 0.1 wt. % to about 2.0 wt. % of the entire layer; or in an amount of from about 0.1 wt. % to about 1.0 wt. % of the entire layer; or in an amount of from about 1.0 wt. % to about 2.0 wt. % of the entire layer; or in an amount of from about 1.0 wt. % to about 3.0 wt. % of the entire layer; or in an amount of from about 0.5 wt. % to about 1.5 wt. % of the entire layer. These amounts are in addition to any silane used as a crosslinker or other interlayer bonding of materials.

The silane-containing adhesion promoter may for example be added to a master batch of the second polymeric composition. Alternatively, the silane-containing adhesion promoter may be pre-mixed or otherwise combined with one or more ingredients forming the second polymeric composition.

In golf balls of the invention, the first and second layers differ in at least one way other than the presence/absence of $TiO_2$ and silane adhesion promoter. For example, the first and second layers may have different chemical and/or physical properties.

Golf balls of the invention demonstrate excellent cover to casing adhesion by adding silanes directly into the material of one of the differing adjacent layers. Thus, overall excellent adhesion, for example, of a polyurethane/urea/polyurethane/urea hybrid cover material to an underlying ionomeric layer is created, meanwhile eliminating the need for the additional surface-treating processing step or an additional tie layer.

And advantageously, embodiments are possible wherein the second layer, comprising the $TiO_2$ and at least one silane-containing adhesion promoter, is an intermediate layer between the first layer and a differing third layer that does not comprise any $TiO_2$ and silane-containing adhesion promoter and surrounds and is adjacent to the second layer. In this embodiment, excellent adhesion is advantageously created not only between the second layer and the first layer, but also between the second layer and the third layer without the need to perform any surface-treating process steps or to position a tie layer at any of the respective interfaces there between. Previously, two separate surface-treatments would be necessary, for example: on the outer surface of the first layer and an inner surface of the third layer; or on the inner surface and outer surface of the second layer.

In one particular embodiment of such a golf ball of the invention, the first layer consists of a thermoset polyurethane composition; the second layer surrounds and is adjacent to the first layer and comprises an ionomer composition with $TiO_2$ and at least one silane-containing adhesion promoter included throughout as specified herein; and a third layer surrounds and is adjacent to the second layer and consists of a thermoplastic polyurethane composition.

Silane-containing adhesion promoters may include, for example, organosilanes, organosiloxanes, and combinations thereof. Non-limiting examples of suitable silanes include silane esters; vinyl silanes; methacryloxy silanes; epoxy silanes; sulfur silanes; amino silanes; ureido silanes; or a mixture thereof. Preferably, the silanes include silane esters, octyltriethoxysilane, methyltriethoxylsilane, methyltrimethoxysilane, nonionic silane dispersing agents; vinyl silanes, vinyltriethoxysilane, vinyltrimethoxysilane, vinyl-tris-(2-methoxyethoxy) silane, vinylmethyldimethoxysilane; methacryloxy silanes, γ-methacryloxypropyltrimethoxysilane; epoxy silanes, β-(3,4-epoxycyclohexyl) ethyltrimethoxysilane, γ-glycidoxypropyltrimethoxysilane; sulfur silanes, γ-mercaptopropyltrimethoxysilane proprietary polysulfidesilane, bis-(3-[triethoxisily]-propyl)-tetrasulfane; γ-aminopropyltriethoxysilane, aminoalkyl silicone solution, modified aminoorganosilanes, n-β-(aminoethyl)-γ-aminopropyltrimethoxysilane, modified aminoorganosilanes, modified aminosilanes, triaminofunctional silanes, bis-(γ-trimethoxysilylpropyl)amine, n-phenyl-γ-aminopropyltrimethoxysilane, organomodified polydimethylsiloxane, polyazamide silane, n-β-(aminoethyl)-γ-aminopropylmethyldimethoxysilane; ureido silanes, γ-ureidopropyltrialkoxysilane, γ-ureidopropyltrimethoxysilane; isocyanate silanes, γ-isocyanatopropyltriethoxysilane; or mixtures thereof.

Suitable cover materials include, for example, thermoplastic polyurethanes, ureas, polyurethane/urea hybrids, ionomers, HNP type ionomers, polyamides, polyesters, etc.

Examples of the numerous possible constructions are as follows. In one embodiment, a golf ball of the invention may have at least three layers—a thermoplastic polyurethane cover surrounding and adjacent to an ionomer or HNP casing layer, which surrounds a crosslinked polybutadiene core of one or more layers.

In another embodiment, a golf ball of the invention may be at least a two-piece golf ball with a thermoplastic polyurethane cover formed about a thermoset or thermoplastic core comprised of one or more different compositions than the cover. In each of these embodiments, any of the layers of the golf ball can be the layer that includes passivated $TiO_2$ and silane-containing adhesion promoter.

The particle size of $TiO_2$ typically dictates its utility in the composition. $TiO_2$, when used as a nanomaterial, is functionally different than pigment-size $TiO_2$ particles and will not impart color or opacity to the material. Pigment-grade $TiO_2$ has a majority of particles in the size range of about half the wavelength of the light to be scattered, that is half of about 400-700 nm (nanometers) or about 200-350 nm.

However, a fraction of the total number of particles may be outside this range and included as a nanomaterial for other purposes such as a UV absorber or photocatalyst. Examples of such $TiO_2$ particle diameters include: less than about 100 nm; about 50-300 nm; about 60-160 nm; greater than about 30 nm; greater than 40 nm; about 3-8 nm; about 10 nm; about 3-20 nm; or even 1 nm-30 mm.

Due to the differing particle sizes, the total surface area of the pigment-grade passivated $TiO_2$ particulates included the mixture will generally be less than the total surface area of any passivated $TiO_2$ particulates added into the mixture as a UV absorber or photocatalyst. A given volume of smaller passivated $TiO_2$ particulates produces a larger combined surface area of passivated $TiO_2$ particulates than the given volume of a fewer number of larger passivated $TiO_2$ particulates.

Within each range, however, varying that total respective surface area can adjust the properties of the resulting material. In some embodiments, a greater number of smaller passivated $TiO_2$ particulates within each of the pigment-grade and UV absorber/photocatalyst ranges may be preferred, whereas in other embodiments, a fewer number of larger passivated $TiO_2$ particulates within each of these ranges may be preferred. Embodiments are also envisioned wherein a combination of both smaller passivated $TiO_2$ particulates and larger passivated $TiO_2$ particulates are included in the mixture in various proportions to produce unique properties.

It is important that all $TiO_2$ particulates-whether pigment-grade or UV absorber-grade and/or photocatalyst-grade—be passivated in order to maximize dual adhesion quality within the layer and between that layer and an adjacent layer.

The passivated $TiO_2$ particulates and at least one silane-containing adhesion promoter may be included in the second polymeric composition in numerous ways. It is envisioned that the passivated $TiO_2$ particulates and at least one silane-containing adhesion promoter may be added into the formulation of the second layer simultaneously or separately. Embodiments are envisioned wherein the passivated $TiO_2$ is added into the formulation for the second polymeric composition before adding the at least one silane-containing adhesion promoter. Alternatively, in some embodiments, the passivated $TiO_2$ particulates may be added into the formulation for the second polymeric composition after the at least one silane-containing adhesion promoter is added into the formulation.

For example, the passivated $TiO_2$ particulates and at least one silane-containing adhesion promoter may be mixed with a prepolymer of the second polymeric composition to form a silane-containing prepolymer that is mixed with a curative.

Alternatively, the passivated $TiO_2$ particulates and at least one silane-containing adhesion promoter may be mixed with the curative of the second polymeric composition to form a silane-containing curative that is mixed with the prepolymer.

In another embodiment, the second layer is formed from a master batch comprising the the passivated $TiO_2$ particulates and at least one silane-containing adhesion promoter and the second polymeric composition.

In yet another embodiment, the passivated TiO$_2$ particulates may be premixed into the second polymeric composition (e.g., into prepolymer, curative, pellets, masterbatch, and then soaked in or otherwise combined with the silane-containing adhesion promoter.

However, embodiments are indeed envisioned wherein the second polymeric composition may be combined with the passivated TiO$_2$ particulates and silane-containing adhesion promoter by adding the passivated TiO$_2$ particulates and silane-containing adhesion promoter to at least one pellet (typically a plurality of pellets) comprised of the second polymeric composition. For example, the pellets may be soaked or dipped in a solution comprising the passivated TiO$_2$ particulates and silane-containing adhesion promoter. In a different embodiment, the passivated TiO$_2$ particulates and at least one silane-containing adhesion promoter may be mixed with the second polymeric composition by compounding. In these such embodiments, targeting a smaller particle size for the passivated TiO$_2$ particulates may be beneficial in at least some circumstances.

The construction of a golf ball of the invention is not otherwise limited regarding the total number of golf ball layers or concerning properties between and within each layer. For example, in one embodiment, the second layer may surround a polybutadiene rubber core having one or more layers. In this embodiment, the first layer can be the outermost core layer and/or a layer that surrounds the second layer, if any. It is also envisioned, however, that the second layer may be an innermost layer of the golf ball such as a spherical core (thermoplastic and/or thermoset). In such embodiments, the first layer would be the layer surrounding and adjacent to that innermost layer.

In one embodiment, the at least one silane-containing adhesion promoter has at least two functional groups. However, embodiments are also envisioned wherein the at least one silane-containing adhesion promoter has three or more functional groups. The total number of sufficient functional groups will always be the number of functional groups required to be dedicated to facilitating crosslinking of or strong bonding between ingredients within the composition of second layer plus the number of functional groups required to be dedicated to facilitating and creating strong bonding between the second layer and the first layer as well as any other adjacent layer such as a third layer where the second layer is an intermediate layer.

Advantageously, the passivated TiO$_2$ particulates and silane-containing adhesion promoter is distributed throughout the second polymeric composition of second layer. Thus, when the second layer is an intermediate layer that is disposed between inner and outer layers which differ from the intermediate layer in some way, excellent adhesion may therefore be created simultaneously between the intermediate layer and the inner layer as well as between the intermediate layer and the outer layer without the need for multiple surface pretreatments or multiple tie layers, or some combination thereof.

For example, in one embodiment, the second layer comprises passivated TiO$_2$ particulates and at least one silane-containing adhesion promoter and is surrounded by and adjacent to a first layer as well as a third layer—each which do not comprise any passivated TiO$_2$ particulates nor silane-containing adhesion promoter. In this embodiment, the second layer is comprised of a second polymeric composition that differs from a first polymeric composition of the first layer and a third polymeric composition of the third layer.

And excellent adhesion is advantageously created both between the first layer and second layer as well as between the second layer and third layer without the need to perform any surface-treating process steps and/or form tie layers at the respective interfaces. Previously, two separate surface-treatments/tie layers would typically be performed, either: on the outer surface of the first layer and an inner surface of the third layer; or on the inner and outer surfaces of the second layer.

In one particular embodiment of such a golf ball of the invention, the first layer consists of a thermoset polyurethane composition; the second layer surrounds and is adjacent to the first layer and comprises an ionomer composition with the passivated TiO$_2$ particulates and at least one silane-containing adhesion promoter throughout; and a third layer surrounds and is adjacent to the second layer and consists of a thermoplastic polyurethane composition. In a different embodiment, the first layer consists of a rubber.

In another embodiment, the first layer consists of a thermoset polyurethane that does not contain any passivated TiO$_2$ particulates and at least one silane-containing adhesion promoter; the second layer surrounds and is adjacent to the first layer and comprises an ionomer with the passivated TiO$_2$ particulates and at least one silane-containing adhesion promoter disposed throughout; and a third layer surrounds and is adjacent to the second layer and consists of a thermoplastic polyurethane that does not contain any passivated TiO$_2$ particulates and at least one silane-containing adhesion promoter. In a different embodiment, the first layer consists of a rubber.

In one embodiment, thermoplastic polyurethane passivated TiO$_2$ particulates-containing pellets may be soaked in a silane-containing adhesion promoter solution for a duration sufficient for the pellets to become soaked with the silane-containing adhesion promoter solution, followed by drying of the silane-soaked thermoplastic polyurethane pellets. The silane-soaked thermoplastic polyurethane pellets are then injection molded over an ionomer casing, resulting, and excellent adhesion is created between the two layers.

In a second non-limiting embodiment, ionomer and passivated TiO$_2$ particulates-containing pellets may be soaked in a silane-containing adhesion promoter solution for a duration sufficient for the pellets to become soaked with the silane solution and the silane-soaked ionomer pellets are then allowed to dry, followed by casing molding via RPIM (retractable pin injection molding). A thermoplastic polyurethane cover may then be molded over the casing layer containing the silane-containing adhesion promoter, resulting in improved adhesion between the casing layer and the surrounding and adjacent cover layer.

In another embodiment, the casing layer may be formed from a silane masterbatch and TiO$_2$-containing ionomer, which is overmolded with a thermoset polyurethane/urea/polyurethane/urea hybrid cover material. Embodiments are also envisioned wherein the passivated TiO$_2$ particulates and silane-containing adhesion promoter are added to the second layer formulation together.

Silane-containing adhesion promoter surface treatments can fail to provide adequate adhesion unless the outer layer molding follows within a specified time window of the surface pretreatment due to the limited shelf life of silane adhesion promoters. In contrast, with golf balls and methods of the invention, such urgency in molding timing is not an issue because the silane-containing adhesion promoter compositions of golf balls of the invention can be stored for example in a master batch within a drum until it is time to form the composition into a layer.

Improved cover to casing adhesion has a direct positive effect on cover shear durability and overall golf ball durability. TABLE I and TABLE II relate to a golf ball wherein the polymeric composition including silane adhesion promoter throughout is non-pigmented, whereas TABLE III relates to a golf ball wherein the second polymeric composition of the second layer is TiO$_2$ white-pigmented.

Accordingly, as set forth in TABLE I below, several inventive golf balls Ex. 1, Ex. 2 and Ex. 3 were made and compared with comparative golf balls Comp. Ex. 1 and Comp. Ex. 2 in order to test and demonstrate the quality of adhesion between a cover layer material incorporating a silane-containing adhesion promoter throughout with an adjacent, differing inner layer (different apart from presence/absence of silane-containing adhesion promoter).

TABLE I

| | Example No. | | | | |
|---|---|---|---|---|---|
| | I | II | III | Comp. Ex. 1 | Comp. Ex. 2 |
| Adhesion Promoter/ Compound | Silquest A-1170 Silane | Silquest A-1120 Silane | Silquest A-187 Silane | CX-100 Aziridine | Corona |
| Class Method | Molded in | Molded in | Molded in | Dip | Surface treatment |
| % Content | 1.5% w/w total | 1.5% w/w total | 1.5% w/w total | 2% Solution in acetone; 1 min; RT | |

In this regard, referring to TABLE I, inventive golf balls Ex. 1, Ex. 2 and Ex. 3 and comparative golf balls Comp. Ex. 1 and Comp. Ex. 2 have identical constructions and formulations except with respect to how improved adhesion is attempted between the differing cover and casing layers. Each golf ball incorporated a cased core and a non-pigmented, clear thermoset polyurethane cover.

The same polybutadiene-based core having an outer diameter of 1.550 inches and the same compression of 80-90; surrounded by a casing layer formed from an ionomer resin blend and having an outer diameter of about 1.62 in., and a thickness of 0.035 in. The ionomer resins are available from Dupont.

The covers were clear and non-pigmented in order to facilitate visual inspection for incidence of delamination. Each cover incorporated a two part cast polyurethane resin.

And finally, each golf ball was painted with a clear topcoat in order to replicate a normal finished golf ball coefficient of friction.

Distinguishably, the cover formulations for golf balls Ex. 1, Ex. 2 and Ex. 3 incorporated at least one silane-containing adhesion promoter throughout to be dedicated to creating strong bonds between the cover and casing, whereas the cover of comparative golf ball Comp. Ex. 2 did not. Specifically, golf ball Ex. 1 included Silquest A-1170 (a secondary aminofunctional bis-silane) throughout, golf ball Ex. 2 included Silquest A-1120 (diamino functional silane) throughout, and golf ball Ex. 3 included Silquest A-187 (epoxy-functional silane) throughout. Each are available from Momentive Performance Materials, Inc.

These silane adhesion promoters were added directly to the prepolymer in amounts of approximately 1.5% (by weight of total polymer), followed by mixing of the prepolymer and curative, and then cast golf balls were made. Only the cased core of comparative golf ball Comp. Ex. 2 was Corona treated.

The cover of comparative golf ball Comp. Ex. 1 did not incorporate a silane-containing adhesion promoter, but rather, a tie layer consisting of a mixture of a polyfunctional aziridine compound and acetone in a wt. % ratio of 2:98 was formed about the casing layer before forming the cover layer thereabout. The polyfunctional aziridine compound used was CX-100, available from DSM Coating Resins LLC.

Specifically, this tie layer was formed about the entire outer surface of the casing layer of comparative golf ball Comp. Ex. 1 by dipping the cased core into the mixture prior to forming cover layer thereabout in accordance with the teachings of co-owned U.S. patent application Ser. No. 14/569,021, filed on Dec. 11, 2014, which is hereby incorporated by reference herein in its entirety. The tie layer interacted with both the casing layer and the cover layer materials at an interface there between during molding.

The cover of comparative golf ball Comp. Ex. 2 did not incorporate a silane-containing adhesion promoter either. Instead, the cased core outer surface was Corona pretreated before molding the cover about the casing layer without a silane-containing adhesion promoter being incorporated in the cover material.

Corona discharge, well known by those of ordinary skill in the art, typically involves an electrical discharge that causes oxygen or other gas molecules within the discharge area to break into their atomic form, leaving them free to bond onto molecules on the surface of the treated article. See, e.g., U.S. Pat. Nos. 6,609,982, 5,466,424 (corona discharge surface treating method) and Stobbe, Bruce, "Corona Treatment 101," *Label and Narrow Web Indus.*, May-June, 1996, the entireties of each are hereby incorporated by reference herein.

Accordingly, in golf balls Ex. 1, Ex. 2 and Ex. 3, the casing and cover became in direct contact at an interface there between when the cover was formed about the casing layer and the two surfaces interacted—without any prior surface Corona or chemical pretreatment, and without the need for any tie layer there between.

All 120 golf balls were allowed to cure for 7 days and then were soaked in water for 7 more days, at which time each golf ball was removed from the water, dried off, and fired once using a "Shear Impact Air Cannon" at approximately 135 ft./sec. into a grooved plate at an angle of about 35° from horizontal.

All golf balls were subsequently visually examined for any delamination of the cover from the casing layer.

TABLE II reveals that none of the 72 inventive golf balls Ex. 1, Ex. 2, Ex. 3 visually failed. None of the comparative golf balls Comp. Ex. 1 incorporating an additional aziradine-based tie layer failed either. However, 17 out of 24 (or about 70.8%) of the Corona surface pretreated golf balls Comp. Ex. 2 did visually fail:

TABLE II

| | | EXAMPLES | | | | |
|---|---|---|---|---|---|---|
| Test Procedure | Measurement | Golf Ball Ex. 1 | Golf Ball Ex. 2 | Golf Ball Ex. 3 | Comp. Golf Ball Ex. 1 | Comp. Golf Ball Ex. 2 |
| Visual Failure of Water Soaked Golf Balls after Impact | No. of Golf Balls Hit | 24 | 24 | 24 | 24 | 24 |
| | No. of Failures | 0 | 0 | 0 | 0 | 17 |

Accordingly, it is evident that a golf ball of the invention incorporating at least one silane-containing adhesion promoter within/throughout the layer formulation of one of two differing and/or otherwise incompatible adjacent layers produces excellent adhesive strength/adhesion at the boundary/interface between those two layers when the at least one adhesion promoter is included with sufficient functional groups dedicated to facilitating and creating strong bonding between the two otherwise incompatible layers. In the example above, excellent adhesion was created between the ionomeric casing layer and the non-pigmented cover layer comprised of polyurethane and silane-containing adhesion promoter throughout.

And excellent adhesion can simultaneously be created between the cover layer of golf balls Ex. 1, Ex. 2 and Ex. 3 and the surrounding paint layer (clear coat) where that formulation differs from that of the cover layer—all without the need for any surface treatment or adhesive of tie layer. The at least one silane-containing adhesion promoter has free functional groups that facilitate and create strong interlayer bonding between the first layer and the second layer.

The examples above are for illustrative purposes only and should not be construed as limiting the present invention in any way.

Advantageously, the silane-containing adhesion promoter may be incorporated into the second layer at any time prior to curing or molding of the layer containing the silane-containing adhesion promoter and distributes throughout the second layer.

Whereas the golf balls of TABLES I and II are non-pigmented, different golf balls were subsequently made having white-pigmented (incorporating $TiO_2$) covers. As is demonstrated in TABLE III, incorporating white pigment $TiO_2$ particulates that are passivated in the second layer formulation (example Ex. 4) rather than being non-passivated (comparative example Comp Ex. 4) creates excellent adhesion between the second layer and an adjacent layer. The $TiO_2$ particulates may be passivated using processes such as disclosed in U.S. Publ. No. 2008/0299056 of Frerichs et al., hereby incorporated by reference herein in its entirety. However, it is envisioned that other known methods for passivating $TiO_2$ could be used as appropriate to prepare the passivated $TiO_2$ particulates being included in the second layer formulation.

Specifically, several inventive white-pigmented golf balls Ex. 4 were made and compared with the same number of comparative golf balls Comp. Ex. 3 and Comp. Ex. 4 in order to evaluate and determine the degree of adhesion improvement between cover and adjacent casing layer when the cover is white-pigmented. The results are set forth in TABLE III below:

TABLE III

| PROPERTIES | Ex. 4 | Comp. Ex. 3 | Comp Ex. 4 |
|---|---|---|---|
| Passivated $TiO_2$ Formulation | Y | N | N |
| Non-Passivated $TiO_2$ Formulation | N | Y | Y |
| Adhesion Promoter | Silquest A-187 | Corona Discharge | Silquest A-187 |
| Dry Ave. Peel Strength (lbf/in) | 18.69 | 12.76 | 18.50 |
| Wet Ave. Peel Strength (lbf/in) | 22.15 | 7.50 | 15.97 |
| Dry Ave. Load (lbf) | 9.35 | 6.38 | 9.25 |
| Wet Ave. Load (lbf) | 11.08 | 3.75 | 7.98 |
| Δ Ave. Peel Strength | +3.46 | −5.26 | −2.53 |
| Δ Ave. Load | +1.73 | −2.63 | −1.27 |

In this regard, all golf balls in each of groups Ex. 4, Comp. Ex. 3 and Comp. Ex. 4 had identical constructions and formulations except for with respect to the selected white pigment for the cover formulation (passivated versus non-passivated $TiO_2$ particulates) and/or the selected ingredient/method for attempting adhesion improvement between cover and adjacent casing layer (silane-containing adhesion promoter versus surface treatment with corona discharge). Accordingly, all golf balls otherwise contained the same polybutadiene-based dual core having an outer diameter of 1.550 inches, an inner core Atti compression of 45-50 and an outer core Atti compression of 85-90.

Meanwhile, each dual core was encased by the same casing layer having a thickness of 0.035 in. and being formed from an ionomer resin blend (available from Dupont). And all golf ball covers otherwise included the same urethane-urea hybrid cast cover system incorporating an aliphatic polyurethane prepolymer cured with Ethacure 100-LC (an aromatic amine-based curative).

Distinguishably, the cover formulation of inventive golf balls Ex. 4 included passivated $TiO_2$ (alumina/silica surface-treated $TiO_2$) in (in an amount of 2.5% of the total weight of the cover composition), whereas the cover formulas of both comparative golf balls Comp. Ex. 3 and comparative golf balls Comp. Ex. 4 instead included non-passivated $TiO_2$ particulates. Additionally, the cover formulations of inventive golf balls Ex. 4 and comparative golf balls Comp. Ex. 4 incorporated the same silane-containing adhesion promoter, which was excluded from the cover formulations of comparative golf balls Comp. Ex. 3 in favor of performing a cased core surface treatment with corona discharge for 1.25 seconds.

In order to evaluate and demonstrate the improved quality of adhesion between cover and casing layer, a sample was created from each golf ball as follows. First, a ½" wide strip centered about the circumference of each ball was cut. Next, an approximate 1" tab of cover material was manually prepared by making a cross cut in the strip and peeling the cover material from the underlying layer. Then, each golf ball was then placed in a freely rotating jig fitted with a rotary encoder and the jig was mounted to the base of a universal test frame. Finally, each prepared tab was clamped into jaws attached to an appropriately sized load cell.

Testing was conducted by advancing the crosshead at 0.5 inches per minute and data was recorded every 0.1° of rotational motion of the test fixture. The load cell recorded the force while the rotary encoder recorded the rotational distance of each ball, which was converted to linear distance peeled and used to determine the length of the pull. After discarding any starting slack in the system, peel strength was reported by taking the average lbf on the load cell of the remaining data divided by the strip width of 0.5".

It is evident from TABLE III above that inventive golf balls Ex. 4 had a greater initial dry average peel strength and dry average load before testing than those of comparative golf balls Comp. Ex. 3 and Comp Ex. 4 even before testing began. In this regard, inventive golf balls Ex. 4 had a dry average peel strength of 18.69 lbf/in and a dry average load of 9.35 lbf, whereas comparative golf balls Comp. Ex. 3 had a dry average peel strength of 12.76 lbf/in and a dry average load of 9.35 lbf and comparative golf balls Ex. 4 had a dry average peel strength of 18.50 lbf/in and a dry average load of 9.25 lbf.

Furthermore, during wetting, both the average peel strength and average load of inventive golf balls Ex. 4 notably further increased, while the average peel strength and average load of comparative golf balls Comp. Ex. 3 and Comp. Ex. 4 reduced. Specifically, the wet average peel strength of inventive golf balls Ex. 4 was 22.15 lbf/in and the wet average load thereof was 11.08 lbf, with the delta (Δ) increase in average peel strength and average load for inventive golf balls Ex. 4 after wetting therefore increasing by +3.46 and +1.73 points, respectively.

In turn, the average peel strength and average load for comparative golf balls Comp. Ex. 3 decreased to 7.50 lbf/in and 3.75 lbf, respectively, thereby translating to delta (Δ) reductions of −5.26 and −2.63, respectively. In turn, comparative golf balls Comp. Ex. 4 had a reduced wet average peel strength of 15.97 lbf/in and a reduced wet average load of 7.98 lbf, translating to delta (Δ) reductions of −2.53 and −1.27, respectively.

Accordingly, golf balls of the invention incorporating both passivated $TiO_2$ particulates and silane-containing adhesion promoter can reduce if not eliminate unwanted reaction between silane and $TiO_2$ which would otherwise interfere with the degree of improvement in adhesion within and between golf ball layers such as between a cover layer and casing layer as shown herein.

As described herein, the layer containing passivated $TiO_2$ particulates and silane-containing adhesion promoter is referred to as the "second layer". In a golf ball of the invention, the first layer does not contain any silane-containing adhesion promoter. However, embodiments are indeed envisioned wherein the first layer might nevertheless contain $TiO_2$ particulates. In such embodiments, there are embodiments in which the $TiO_2$ particulates would be passivated. In other embodiments, the $TiO_2$ particulates would be non-passivated.

Numerous specific constructions of a golf ball of the invention are envisioned as being suitable for incorporating the first and second layers. For example, in an embodiment as described above wherein the first layer surrounds a polybutadiene rubber inner core, the first layer may be any intermediate layer such as an outer core layer, a casing layer, or an inner cover layer. Of course it is also envisioned that the first layer may be the inner core itself.

Meanwhile, the second layer may be any layer of the golf ball, as long as the second layer is adjacent to another layer such that direct interactions can occur between surfaces of the second layer and that other layer (first layer) at an interface there between.

In one embodiment, the first polymeric composition is a non-polyurethane composition and the second polymeric composition is a polyurethane composition. The non-polyurethane composition may be an ionomer, for example. In another embodiment, the first polymeric composition is a polyurethane composition and the second polymeric composition is a non-polyurethane composition.

In an alternative embodiment, the first polymeric composition is a non-polyurea composition and the second polymeric composition is a polyurea composition. Or, the first polymeric composition may be a polyurea composition and the second polymeric composition may be a non-polyurea composition.

In yet another embodiment, the first polymeric composition is a non-polyurethane/urea hybrid composition and the second polymeric composition is a polyurethane/urea hybrid composition. Or, the first polymeric composition may be a polyurethane/urea hybrid composition and the second polymeric composition may be a non-polyurethane/urea hybrid composition.

In a different embodiment, the first polymeric composition is a rubber composition and the second polymeric composition is a non-rubber composition. Alternatively, the first polymeric composition may be a non-rubber composition whereas the second polymeric composition is a rubber composition.

In one embodiment, the first polymeric composition is a not a polyurethane and the second polymeric composition is a polyurethane. The first polymeric composition may be an ionomer, for example. In another embodiment, the first polymeric composition may be a polyurethane and the second polymeric composition is not a polyurethane.

In an alternative embodiment, the first polymeric composition is not a polyurea and the second polymeric composition is a polyurea. Or, the first polymeric composition may be a polyurea while the second polymeric composition is not a polyurea.

In yet another embodiment, the first polymeric composition is a not a polyurethane/urea hybrid and the second polymeric composition is a polyurethane/urea hybrid. Or, the first polymeric composition may be a polyurethane/urea hybrid while the second polymeric composition is not a polyurethane/urea hybrid.

In a different embodiment, the first polymeric composition is not a rubber while the second polymeric composition is a rubber. And alternatively, the first polymeric composition may be a rubber while the second polymeric composition is not a rubber.

Embodiments are also envisioned wherein the first polymeric composition is a first polyurethane composition and the second polymeric composition is a second polyurethane composition that is different than the first polyurethane composition. Likewise, the first polymeric composition may be a first polyurea composition while the second polymeric composition is a second polyurea composition that is different than the first polyurea composition. In other embodiments, the first polymeric composition may be a first polyurethane/urea hybrid composition while the second polymeric composition is a second polyurethane/urea hybrid composition that is different than the first polyurethane/urea hybrid composition. And in still other embodiments, the first polymeric composition may be a first rubber composition while the second polymeric composition is a second rubber composition that is different than the first rubber composition.

In alternative embodiments, the first polymeric composition is a first polyurethane and the second polymeric composition is a second polyurethane that is different than the first polyurethane composition. Likewise, the first polymeric composition may be a first polyurea while the second polymeric composition is a second polyurea that is different than the first polyurea. In other embodiments, the first polymeric composition may be a first polyurethane/urea hybrid while the second polymeric composition is a second polyurethane/urea hybrid that is different than the first polyurethane/urea hybrid. And in still other embodiments, the first polymeric composition may be a first rubber while the second polymeric composition is a second rubber that is different than the first rubber.

It is envisioned that the first polymeric composition and the second polymeric composition may each be any polymeric composition suitable for forming a golf ball layer, as long as the first polymeric composition and the second polymeric composition differ in some respect (in addition to presence/absence of $TiO_2$ and silane-containing adhesion promoter) such as having different chemical and/or physical properties or being otherwise incompatible.

For example, in one embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, a polyurethane/urea hybrid, ionomer, polyamide, polyester, or rubber as well as passivated $TiO_2$ particulates; and silane-containing adhesion promoter(s) throughout.

In another embodiment, the first polymeric composition consists of a thermoplastic or thermoset polyurethane, a urea, a polyurethane/urea hybrid, an ionomer, a polyamide, a polyester, or a rubber; and the second polymeric composition consists of a different thermoplastic or thermoset polyurethane, urea, a polyurethane/urea hybrid, ionomer, polyamide, polyester, or rubber as well as passivated $TiO_2$ particulates and silane-containing adhesion promoter(s) throughout.

In one embodiment, the second layer surrounds the first layer. For example, the white-pigmented second layer may be a cover layer that consists of a polyurethane composition and surrounds the first layer, which is an inner cover layer or casing layer and is comprised of an ionomer. In this embodiment, the first layer does not contain any passivated TiO$_2$ particulates and silane-containing adhesion promoter(s).

In other embodiments, the first layer surrounds the second layer. For example, the first layer may be transparent or translucent polyurethane outer cover layer or coating layer that surrounds and is adjacent to the second layer. The first layer may be colorless, clear tinted or translucent, whereas the second layer is always white-pigmented.

A golf ball of the invention may otherwise have any known construction as long as there are two adjacent layers therein that are formed form different compositions or are otherwise incompatible in that they would bond together poorly without the help of an adhesion promoting surface pretreatment or tie layer, etc. In one particular embodiment of a golf ball of the invention, the first layer is formed about a rubber-containing core, wherein the base rubber may be selected from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers selected from polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, metallocene-catalyzed elastomers, and plastomers.

Suitable curing processes include, for example, peroxide curing, sulfur curing, radiation, and combinations thereof. In one embodiment, the base rubber is peroxide cured. Organic peroxides suitable as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Peroxide free-radical initiators are generally present in the rubber compositions in an amount within the range of 0.05 to 15 parts, preferably 0.1 to 10 parts, and more preferably 0.25 to 6 parts by weight per 100 parts of the base rubber. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the cross-linking agent is selected from zinc salts of acrylates, diacrylates, methacrylates, and dimethacrylates. When the cross-linking agent is zinc diacrylate and/or zinc dimethacrylate, the agent typically is included in the rubber composition in an amount within the range of 1 to 60 parts, preferably 5 to 50 parts, and more preferably 10 to 40 parts, by weight per 100 parts of the base rubber.

In a preferred embodiment, the cross-linking agent used in the rubber composition of the core and epoxy composition of the intermediate layer and/or cover layer is zinc diacrylate ("ZDA"). Adding the ZDA curing agent to the rubber composition makes the core harder and improves the resiliency and COR of the ball. Adding the same ZDA curing agent epoxy composition makes the intermediate and cover layers harder and more rigid. As a result, the overall durability, toughness, and impact strength of the ball is improved.

Sulfur and sulfur-based curing agents with optional accelerators may be used in combination with or in replacement of the peroxide initiators to cross-link the base rubber. High energy radiation sources capable of generating free-radicals may also be used to cross-link the base rubber. Suitable examples of such radiation sources include, for example, electron beams, ultra-violet radiation, gamma radiation, X-ray radiation, infrared radiation, heat, and combinations thereof.

The rubber compositions may also contain "soft and fast" agents such as a halogenated organosulfur, organic disulfide, or inorganic disulfide compound. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95. ZnPCTP is commercially available from EchinaChem (San Francisco, Calif.). These compounds also may function as cis-to-trans catalysts to convert some cis-1,4 bonds in the polybutadiene to trans-1,4 bonds. Peroxide free-radical initiators are generally present in the rubber compositions in an amount within the range of 0.05 to 10 parts and preferably 0.1 to 5 parts. Antioxidants also may be added to the rubber compositions to prevent the breakdown of the elastomers. Other ingredients such as accelerators (for example, tetra methylthiuram), processing aids, processing oils, dyes and pigments, wetting agents, surfactants, plasticizers, as well as other additives known in the art may be added to the composition. Generally, the fillers and other additives are present in the rubber composition in an amount within the range of 1 to 70 parts by weight per 100 parts of the base rubber. The core may be formed by mixing and forming the rubber composition using conventional techniques. Of course, embodiments are also envisioned wherein outer layers comprise such rubber-based compositions Cores, intermediate/casing layers, and cover layers may be formed from an ionomeric material including ionomeric polymers, preferably highly-neutralized ionomers (HNP). In another embodiment, the intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, preferably comprises ionomeric copolymers and terpolymers, ionomer precursors, thermoplastics, polyamides, polycarbonates, polyesters, polyurethanes, polyureas, polyurethane/urea hybrids, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from Exxon Mobil Chemical Company. Some suitable examples of highly neutralized ionomers (HNP) are DuPont® HPF 1000 and DuPont® HPF 2000, ionomeric materials commercially available from E. I. du Pont de Nemours and Company. In some embodiments, very low modulus ionomer- ("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

Any golf ball component, namely core, intermediate layer, cover, etc. may also be formed from or comprise or include or be blended or otherwise combined or mixed with any of the following compositions as known in the art to achieve particular desired golf ball characteristics:

(1) Polyurethanes, such as those prepared from polyols and diisocyanates or polyisocyanates and/or their prepolymers, and those disclosed in U.S. Pat. Nos. 5,334,673 and 6,506,851;

(2) Polyureas, such as those disclosed in U.S. Pat. Nos. 5,484,870 and 6,835,794; and (3) Polyurethane/urea hybrids, blends or copolymers comprising urethane and urea segments such as those disclosed in U.S. Pat. No. 8,506,424.

Suitable polyurethane compositions comprise a reaction product of at least one polyisocyanate and at least one curing agent. The curing agent can include, for example, one or more polyols. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated herein in its entirety by reference.

In general, polyurea compositions contain urea linkages formed by reacting an isocyanate group (—N=C=O) with an amine group (NH or NH$_2$). The chain length of the polyurea prepolymer is extended by reacting the prepolymer with an amine curing agent. The resulting polyurea has elastomeric properties, because of its "hard" and "soft" segments, which are covalently bonded together. The soft, amorphous, low-melting point segments, which are formed from the polyamines, are relatively flexible and mobile, while the hard, high-melting point segments, which are formed from the isocyanate and chain extenders, are relatively stiff and immobile. The phase separation of the hard and soft segments provides the polyurea with its elastomeric resiliency. The polyurea composition contains urea linkages having the following general structure:

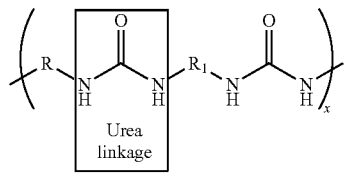
Urea linkage where x is the chain length, i.e., about 1 or greater, and R and R$_1$ are straight chain or branched hydrocarbon chains having about 1 to about 20 carbon atoms.

A polyurea/polyurethane hybrid composition is produced when the polyurea prepolymer (as described above) is chain-extended using a hydroxyl-terminated curing agent. Any excess isocyanate groups in the prepolymer will react with the hydroxyl groups in the curing agent and create urethane linkages. That is, a polyurea/polyurethane hybrid composition is produced.

In a preferred embodiment, a pure polyurea composition, as described above, is prepared. That is, the composition contains only urea linkages. An amine-terminated curing agent is used in the reaction to produce the pure polyurea composition. However, it should be understood that a polyurea/polyurethane hybrid composition also may be prepared in accordance with this invention as discussed above. Such a hybrid composition can be formed if the polyurea prepolymer is cured with a hydroxyl-terminated curing agent. Any excess isocyanate in the polyurea prepolymer reacts with the hydroxyl groups in the curing agent and forms urethane linkages. The resulting polyurea/polyurethane hybrid composition contains both urea and urethane linkages. The general structure of a urethane linkage is shown below:

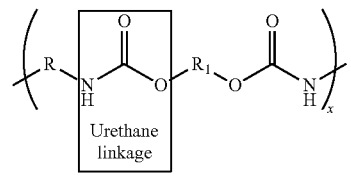
Urethane linkage where x is the chain length, i.e., about 1 or greater, and R and R$_1$ are straight chain or branched hydrocarbon chains having about 1 to about 20 carbon atoms.

There are two basic techniques that can be used to make the polyurea and polyurea/urethane compositions of this invention: a) one-shot technique, and b) prepolymer technique. In the one-shot technique, the isocyanate blend, polyamine, and hydroxyl and/or amine-terminated curing agent are reacted in one step. On the other hand, the prepolymer technique involves a first reaction between the isocyanate blend and polyamine to produce a polyurea prepolymer, and a subsequent reaction between the prepolymer and hydroxyl and/or amine-terminated curing agent. As a result of the reaction between the isocyanate and polyamine compounds, there will be some unreacted NCO groups in the polyurea prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurea and polyurea/urethane compositions of the invention; however, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

In the casting process, the polyurea and polyurea/urethane compositions can be formed by chain-extending the polyurea prepolymer with a single curing agent or blend of curing agents as described further below. The compositions of the present invention may be selected from among both castable thermoplastic and thermoset materials. Thermoplastic polyurea compositions are typically formed by reacting the isocyanate blend and polyamines at a 1:1 stoichiometric ratio. Thermoset compositions, on the other hand, are cross-linked polymers and are typically produced from the reaction of the isocyanate blend and polyamines at normally a 1.05:1 stoichiometric ratio. In general, thermoset polyurea compositions are easier to prepare than thermoplastic polyureas.

The polyurea prepolymer can be chain-extended by reacting it with a single curing agent or blend of curing agents (chain-extenders). In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PT-MEG), preferably having a molecular weight from about 250 to about 3900; and mixtures thereof.

Suitable amine chain-extending (curing) agents that can be used in chain-extending the polyurea prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benzeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediyl-bis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-di-amino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis (sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea/urethane hybrid.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

In an alternative embodiment, the cover layer is formed from a polyurethane or polyurethane/urea hybrid composition. In general, polyurethane compositions contain urethane linkages formed by reacting an isocyanate group (—N=C=O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

Suitable isocyanate compounds that can be used to prepare the polyurethane or polyurethane/urea hybrid material are described above. These isocyanate compounds are able to react with the hydroxyl or amine compounds and form a durable and tough polymer having a high melting point. The resulting polyurethane generally has good mechanical strength and cut/shear-resistance. In addition, the polyurethane composition has good light and thermal-stability.

When forming a polyurethane prepolymer, any suitable polyol may be reacted with the above-described isocyanate blends in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

In a manner similar to making the above-described polyurea compositions, there are two basic techniques that can be used to make the polyurethane compositions of this invention: a) one-shot technique, and b) prepolymer technique. In the one-shot technique, the isocyanate blend, polyol, and hydroxyl-terminated and/or amine-terminated chain-extender (curing agent) are reacted in one step. On the other hand, the prepolymer technique involves a first reaction between the isocyanate blend and polyol compounds to produce a polyurethane prepolymer, and a subsequent reaction between the prepolymer and hydroxyl-terminated and/or amine-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is in the range of about 1.01:1.00 to about 1.10:1.00. Preferably, the molar ratio is greater than or equal to 1.05:1.00. For example, the molar ratio can be in the range of 1.05:1.00 to 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single curing agent (chain-extender) or blend of curing agents (chain-extenders) as described further below. The compositions of the present invention may be selected from among both castable thermoplastic and thermoset polyurethanes. Thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio. In general, thermoset polyurethane compositions are easier to prepare than thermoplastic polyurethanes.

As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyol compounds for producing the polyurethane prepolymer or between the polyurethane prepolymer and chain-extender during the chain-extending step. Preferably, the catalyst is added to the reactants before producing the polyurethane prepolymer. Suitable catalysts include, but are not limited to, the catalysts described above for making the polyurea prepolymer. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

Suitable hydroxyl chain-extending (curing) agents and amine chain-extending (curing) agents include, but are not limited to, the curing agents described above for making the polyurea and polyurea/urethane hybrid compositions. When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

Meanwhile, the dimensions of each golf ball component such as the diameter of the core and respective thicknesses of the intermediate layer (s), cover layer(s) and coating layer(s) may be selected and coordinated as known in the art for targeting and achieving desired playing characteristics or feel. For example, the core may have a diameter of from about 1.47 inches (in.) to about 1.62 in.; the intermediate/casing layer may have a thickness of from about 0.025 in. to about 0.057 in.; a core and intermediate/casing layer, combined, may have a diameter of from about 1.57 in. to about 1.65 in.; the cover may have a thickness of from about 0.015 in. to about 0.055 in.; and any coating layers may have a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

A golf ball of the invention may also incorporate indicia such any symbol, letter, group of letters, design, or the like, that can be added to the dimpled surface of a golf ball. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball comprising:
   a colorless coating surrounding and adjacent to a $TiO_2$ white-pigmented layer comprising a polymeric composition that comprises throughout: (i) a plurality of passivated $TiO_2$ particulates; and (ii) at least one silane-containing adhesion promoter in an amount of from about 0.1 wt. % to about 5.0 wt. % of the total weight of the polymeric composition;
   wherein the coating comprises a coating composition that is different than the polymeric composition and does not contain any silane-containing adhesion promoter; and
   wherein there is no surface treatment with adhesion promoter at an interface between the colorless coating and $TiO_2$ white-pigmented layer.

2. The golf ball of claim 1, wherein the at least one silane-containing adhesion promoter is selected from the group consisting of organosilanes and silane-based organosiloxanes.

3. The golf ball of claim 1, wherein the passivated $TiO_2$ particulates are included in the polymeric composition in an amount of from about 1 wt. % to about 10 wt. % based on the total weight of the polymeric composition.

4. The golf ball of claim 3, wherein the passivated $TiO_2$ particulates are surface treated with alumina and silica.

5. The golf ball of claim 3, wherein at least some of the passivated $TiO_2$ particulates are surface treated with alumina and silica.

6. The golf ball of claim 3, wherein at least some of the passivated $TiO_2$ particulates are surface treated with alumina and zirconia.

7. The golf ball of claim 5, wherein the passivated $TiO_2$ particulates are included in the polymeric composition in an amount of at least 2 wt. % and up to about 10 wt. % of the total weight of the polymeric composition.

8. The golf ball of claim 5, wherein passivated $TiO_2$ particulates are included having a diameter of from about 200 nm to about 350 nm.

9. The golf ball of claim 5, wherein at least some of the passivated $TiO_2$ particulates have a diameter of less than 200 nm, and at least some of the passivated TiO₂ particulates have a diameter of greater than 350 nm.

10. The golf ball of claim 1, wherein the polymeric composition comprises a polyurethane.

11. The golf ball of claim 10, wherein the polyurethane is thermoplastic.

12. The golf ball of claim 10, wherein the polyurethane is thermoset.

13. The golf ball of claim 1, wherein the polymeric composition comprises an ionomer.

14. The golf ball of claim 1, wherein polymeric composition comprises a highly neutralized polymer.

15. The golf ball of claim 1, wherein the TiO₂ white-pigmented layer is a cover.

16. A golf ball comprising:
a clear tinted coating surrounding and adjacent to a layer comprising a polymeric composition that comprises throughout: (i) a plurality of passivated TiO₂ particulates; and (ii) at least one silane-containing adhesion promoter in an amount of from about 0.1 wt. % to about 5.0 wt. % of the total weight of the polymeric composition;
wherein the clear-tinted coating does not contain any silane-containing adhesion promoter; and
wherein there is no surface treatment with adhesion promotor at an interface between the clear-tinted coating and the layer.

17. The golf ball of claim 16, wherein the at least one silane-containing adhesion promoter is selected from the group consisting of organosilanes and silane-based organosiloxanes.

18. The golf ball of claim 16, wherein the passivated TiO₂ particulates are included in the polymeric composition in an amount of from about 1 wt. % to about 10 wt. % based on the total weight of the polymeric composition.

19. A golf ball comprising:
a translucent coating surrounding and adjacent to a layer comprising a polymeric composition that comprises throughout: (i) a plurality of passivated TiO₂ particulates; and (ii) at least one silane-containing adhesion promoter in an amount of from about 0.1 wt. % to about 5.0 wt. % of the total weight of the second polymeric composition;
wherein the translucent coating does not contain any silane-containing adhesion promoter; and
wherein there in no surface treatment with adhesion promotor at an interface between the translucent coating and layer.

20. The golf ball of claim 19, wherein the at least one silane-containing adhesion promoter is selected from the group consisting of organosilanes and silane-based organosiloxanes.

21. The golf ball of claim 19, wherein the passivated TiO₂ particulates are included in the polymeric composition in an amount of from about 1 wt. % to about 10 wt. % based on the total weight of the polymeric composition.

* * * * *